US010839704B2

(12) United States Patent
Oswald et al.

(10) Patent No.: US 10,839,704 B2
(45) Date of Patent: Nov. 17, 2020

(54) SIMULATION OF A COMPLEX SYSTEM

(71) Applicant: Airbus Defence and Space GmbH, Ottobrunn (DE)

(72) Inventors: Ralf Oswald, Kempfeld (DE); Robert Huber, Neukirchen (DE); Martin Foerster, Schmoelln (DE)

(73) Assignee: Airbus Defence and Space GmbH, Ottobrunn (DE)

( * ) Notice: Subject to any disclaimer, the term of this patent is extended or adjusted under 35 U.S.C. 154(b) by 336 days.

(21) Appl. No.: 14/409,095

(22) PCT Filed: Jun. 10, 2013

(86) PCT No.: PCT/DE2013/000311
§ 371 (c)(1),
(2) Date: Dec. 18, 2014

(87) PCT Pub. No.: WO2013/189475
PCT Pub. Date: Dec. 27, 2013

(65) Prior Publication Data
US 2015/0194062 A1 Jul. 9, 2015

(30) Foreign Application Priority Data

Jun. 19, 2012 (DE) .................. 10 2012 012 044

(51) Int. Cl.
*G09B 5/02* (2006.01)
*G06F 9/54* (2006.01)
(Continued)

(52) U.S. Cl.
CPC ............. *G09B 5/02* (2013.01); *G06F 9/5066* (2013.01); *G06F 9/54* (2013.01); *G09B 19/0053* (2013.01); *G09B 25/02* (2013.01); *H04L 67/42* (2013.01)

(58) Field of Classification Search
CPC ... G09B 9/28; G09B 9/30; G09B 9/32; G09B 9/34; G09B 9/00; G09B 9/003;
(Continued)

(56) References Cited

U.S. PATENT DOCUMENTS 3,919,720 A * 11/1975 Alliston .................. G09B 9/00
376/217
8,209,158 B1 * 6/2012 Fielder ................ G06F 17/5009
703/13

(Continued)

FOREIGN PATENT DOCUMENTS

DE    10 2011 114 225 B3    6/2012
WO    WO 2007/109507 A2    9/2007

OTHER PUBLICATIONS

K. Engel et al., "Combining Local and Remote Visualization Techniques for Interactive Volume Rendering in Medical Applications," Proceedings of the conference on Visualization, 2000, IEEE Computer Society Press, Los Alamitos, CA, USA, XP002715698 (Five (5) pages).

(Continued)

*Primary Examiner* — Timothy A Musselman
(74) *Attorney, Agent, or Firm* — Crowell & Moring LLP

(57) ABSTRACT

Simulation of a complex system involves representing the complex system in a plurality of simulation building blocks, each simulation building block is associated with a subsystem of the complex system. Each simulation building block includes at least one client-side simulation component and a server-side simulation component. During the simulation a user interaction is detected by a client-side simulation component, the complex system is simulated in server-side simulation components on the basis of the user interaction. Simulation data for the subsystem is generated by the server-side simulation components, and the subsystem is (Continued)

represented by the corresponding client-side components based on the simulation data.

8 Claims, 1 Drawing Sheet

(51) Int. Cl.
    *G06F 9/50*     (2006.01)
    *G09B 19/00*     (2006.01)
    *G09B 25/02*     (2006.01)
    *H04L 29/06*     (2006.01)

(58) Field of Classification Search
    CPC . G09B 9/006; G09B 9/02; G09B 9/04; G09B 9/06; G09B 9/08; G09B 9/52; G09B 9/54; G09B 9/56
    See application file for complete search history.

(56) References Cited

U.S. PATENT DOCUMENTS

| | | | |
|---|---|---|---|
| 2002/0072414 A1* | 6/2002 | Stylinski | A63F 13/12 463/42 |
| 2005/0171746 A1* | 8/2005 | Thalhammer-Reyero | G05B 17/02 703/2 |
| 2007/0286089 A1 | 12/2007 | Nasle et al. | |
| 2008/0104609 A1 | 5/2008 | D'Amora et al. | |
| 2008/0168092 A1* | 7/2008 | Boggs | G05B 17/02 |
| 2009/0099824 A1* | 4/2009 | Falash | H04L 67/38 703/8 |

OTHER PUBLICATIONS

E. Blumel et al., "Virtual Environments for the Training of Maintenance and Service Tasks," Machine Learning and Cybernetics, Proceedings of the 2003 Winter Simulation Conference, vol. 2, Dec. 7, 2003, pp. 2001-2007, Piscataway, NJ, USA, XP010679968.

Z. Chaoyou et al., "A Distributed System for Aircraft Hydraulic System Simulation Test Based on LXI," IEEE Autotestcon, Sep. 8, 2008, pp. 185-188, Piscataway, NJ, USA, XP031355027.

J. Misra, "Distributed Discrete-Event Simulation," ACM Computing Surveys, vol. 18, No. 1, Mar. 1986, pp. 39-65, New York, NY, USA, XP002715699.

International Search Report (PCT/ISA/210) dated Nov. 12, 2013 with English-language translation (Six (6) pages).

German-language Written Opinion (PCT/ISA/237) dated Nov. 12, 2013 (Nine (9) pages).

* cited by examiner

SIMULATION OF A COMPLEX SYSTEM

FIELD OF THE INVENTION

Exemplary embodiments of the invention relate to a method for simulating a complex system and relates to a simulation system.

BACKGROUND OF THE INVENTION

Simulations are used in the maintenance sector to prepare engineers for their tasks. These tasks comprise, for example, the maintenance of a technical system, such as an aircraft system.

During the simulation, the technical system is simulated on a computer, for example a mainframe computer, and a maintenance engineer can be trained on a terminal that is connected to the mainframe computer. With increasing complexity of the technical system, also the complexity of the simulation increases. Modifying the simulation, for example, in order to adapt it to modifications to the technical system, often requires great effort. Also the development of a new simulation for a new technical system is complex and expensive.

SUMMARY OF THE INVENTION

Exemplary embodiments of the invention simplify and accelerate the operation of training simulations.

One aspect of the invention relates to a method for simulating a complex system. The complex system may, for example, be a technical system such as for example an aircraft system, a vehicle system or an industrial plant. In particular, the complex system may comprise a plurality of subsystems that interact with each other. Examples of such subsystems comprise switches, controls, motors, valves, etc.

The method can be carried out by a computer program that can run distributed over several computers that form a simulation system. The computer program is used to map the complex system onto a plurality of simulation building blocks, each simulation building block being associated with one or more subsystems of the complex system. Each simulation building block comprises at least one client-side simulation component and one server-side simulation component.

According to one embodiment of the invention, the method comprises the following steps: detecting a user interaction with at least one client-side simulation component; simulating the complex system in server-side simulation components based on the user interaction, wherein the server-side simulation components generate simulation data for the subsystems; representing the subsystem based on the simulation data by the corresponding client-side components.

The client-side component of a simulation building block is used for representing the respective subsystem. The server-side component is used for simulating the respective subsystem. Some of the simulation building blocks can be used for simulating subsystems a user can interact with, such as a switch. In these simulation building blocks, the client-side component is designed to detect and also represent user interactions, such as the pressing of a switch; the flicking of a switch; the turning of a switch; the opening of a flap, the opening of a door.

It is to be understood that a component of the simulation system is a self-contained software module that can, for example, be replaced separately from other software modules.

Thus, the simulation and in particular the simulation program or the simulation software is subdivided into modular units by the simulation building blocks, which can be reused, slightly modified and complemented.

A simulation component of a simulation can be reused in another simulation. For example, a user of the simulation system can compose a new simulation on the basis of already existing simulation building blocks. It is also possible to compile a new simulation that is based on a plurality of already existing building blocks and a few newly implemented building blocks. This allows cost savings to be achieved during the development of a new simulation.

This also reduces the complexity of the simulation system because individual simulation building blocks can be changed without the other simulation building blocks being affected by such changes. Since the simulation of the complex system results in an emerging manner from the individual simulations of the subsystems by the simulation building blocks, also highly complex systems can be simulated using a large number of individual simulation building blocks.

Subdividing the simulation into simulation building blocks allows the simulation to run in a distributed manner, so that it can be carried out on a number of computers or computer kernels. In particular, the individual server- and/or client-side components can be carried out in parallel on a number of processor kernels. Thus, complex systems can be simulated in a server cloud.

According to one embodiment of the invention, the method optionally comprises the further step of: controlling a hardware subsystem and/or controlling a software subsystem (such as e.g. interaction with original software) of the complex system by means of a simulation building block. In doing so, output data of the hardware subsystem can be detected by the simulation building block and/or simulation data can be generated by the simulation building block. In other words, the simulation building block can represent an interface with a real component of the complex system. For example, a real electronic controller of the complex system can be integrated into the simulation. In this way, the behavior of the controller in cooperation with other subsystems of the complex system can be investigated.

According to one embodiment of the invention, the method further comprises the following step: communicating the user interaction and/or the simulation data between a client-side component and a server-side component via a communication network. In this way, a device-independent use of the simulation in a networked operation becomes possible. As a client or carrier of the client-side component, for example a workstation, a notebook, a smartPad or an iPhone may be used.

Simulation data may be data describing the conditions of the respective subsystem, such as the rotary speed of a motor, the switch position of a switch, or the electrical power that is consumed by the motor. The simulation data can on the one hand be used by other simulation building blocks for simulating the respectively associated subsystem on the basis of this simulation data. For example, a building block that simulates a fan can adopt the rotary speed of a simulation building block that simulates a motor. On the other hand, the simulation data can be used for representing the respective subsystem. A client computer could, for example, represent a rotating fan if the associated rotary speed is not equal to zero.

According to one embodiment of the invention, the subsystem is represented by a web browser. For example, the client-side component is implemented by means of a browser-based language. Such a language could for example be JavaScripts. However, also DART or C/C++ is possible, if it is processed by the respective web browser. In this way it is possible for each standard device to be used as a client computer that comprises an HTML 5 enabled and a WebGL-enabled browser, which then downloads the required client-side components of the simulation system.

According to one embodiment of the invention, the method further comprises the following steps: communicating simulation data from a first simulation building block to a second simulation building block; simulating a subsystem associated with the second simulation building block on the basis of the simulation data. As has already been said, the simulation building blocks are constructed in a modular manner and can be greatly separated from each other, so that only a data exchange but no mutual function calls will be carried out.

According to one embodiment of the invention, the method further comprises the following step: communicating the simulation data by means of message packets between the simulation building blocks. Thus, the simulation building blocks can be installed in a simple manner on different server processors and/or can be carried out in parallel. Also, the simulation building blocks can be delimited from each other and can influence each other only by messages. This can also facilitate an exchange or a modification of simulation building blocks.

According to one embodiment of the invention, the server-side components are implemented by means of a JVM-based language. An example of such a language is SCALA. In particular, the simulation building blocks may be Java modules.

According to one embodiment of the invention, the client-side components are implemented in a client and the server-side components are implemented in a server that is connected to the client via a communication network. Client and server may be software components on a single computer. The client may be a client computer and the server may be a server computer.

A further aspect of the invention relates to program elements that, if executed on at least one processor, prompt the at least one processor to carry out the steps of the method, as has been or will be described above and/or below. The program elements may be Java modules, modules on programming languages based on Java, JavaScript modules, modules of browser-based languages and templates such as XML templates. The program elements may together form a computer program that is designed to carry out the simulation method as described above and below.

A further aspect of the invention relates to a computer-readable medium, on which such program elements are stored. A computer-readable medium may here be a disk, a hard disk, a USB storage device, a RAM, a ROM or an EPROM. A computer-readable medium may also be a data communication network such as the internet, which allows a program code to be downloaded.

A further aspect of the invention relates to the use of the simulation method for training an engineer in the maintenance and/or repair of the complex system. As a result of the correspondingly assembled simulation building blocks, training and behavior methods may be provided that deal with the behavior and/or the interaction of a user (i.e. of the engineer) and thus allow non-linear training.

A further aspect of the invention relates to a simulation system that is designed to simulate a complex system.

According to one embodiment of the invention, the simulation system comprises at least one computer on which simulation building blocks are stored, which respectively comprise a client-side component and a server-side component. For example, the simulation system comprises at least one client computer and one server computer on which the respective components are stored. A simulation building block is associated with a subsystem of the complex system. A client-side component of the subsystem is designed to detect a user interaction with the simulated subsystem and to represent the simulated subsystem on the client (or the screen thereof). A server-side component is designed to simulate the subsystem on the basis of the user interaction.

According to one embodiment of the invention, the simulation system further comprises an optional hardware subsystem of the complex system. At least one of the simulation building blocks is designed to control the hardware subsystem and/or to detect output data of the hardware subsystem.

The simulation system can be used as a training system in the maintenance sector for maintaining aircraft. Also, the simulation system can be used as a universal training system in the industrial and non-industrial sectors, for example in the supply industry or in the general technical industry. An example are medium-sized enterprises in the automotive industry, who are unable to send their employees to training courses on a regular basis and who obtain instructions for assembling and disassembling vehicle components or for the maintenance thereof together with the simulation system. Also, when buying pieces of furniture, they may be linked with an interactive, three dimensional instruction manual (for example via an internet link) that describes the assembly of the piece of furniture.

Also, the simulation system can be used in the public school and education system.

Embodiment examples of the invention will be described in detail below with reference to the attached figures.

BRIEF DESCRIPTION OF THE FIGURES

In principle, identical or similar parts have been provided with the same reference signs.

DETAILED DESCRIPTION OF EMBODIMENT EXAMPLES

Figure 1:
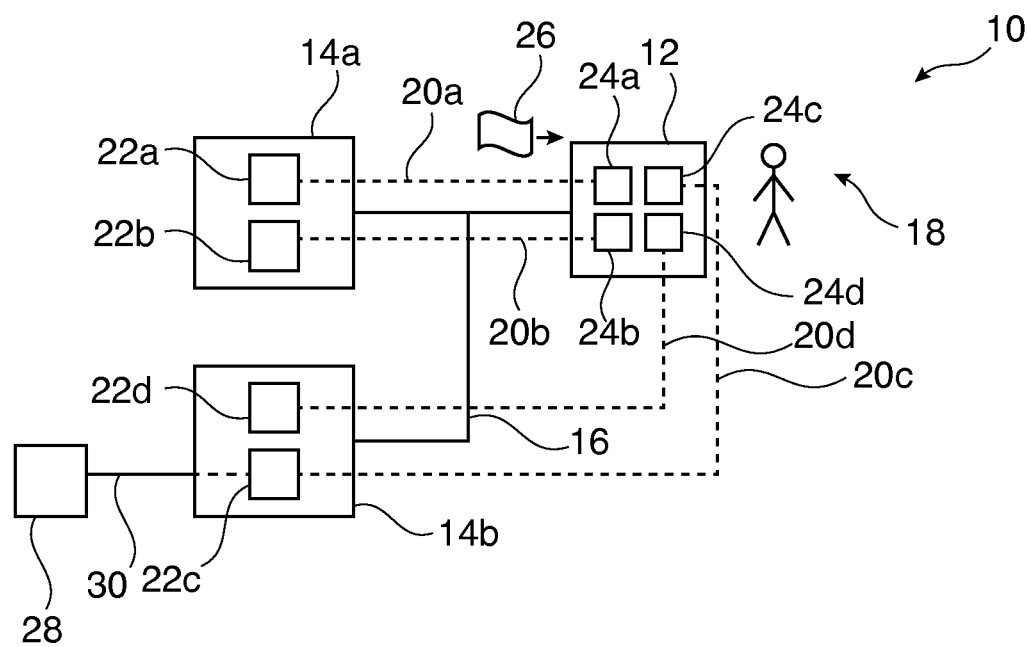
FIG. 1 shows a schematic view of a simulation system according to an embodiment of the invention.

FIG. 1 shows a simulation system 10 that comprises one or more clients 12 and a number of servers 14a, 14b connected to the client 12 by means of a communication network 16, for example an IP network or the internet. It is to be understood that the system 10 may comprise further clients 12, on which a plurality of users 18 can interact with the system 10 at the same time. Wherever reference is made below to the client 12, this may also relate to a plurality of clients 12.

The client 12 and the servers 14a, 14b may be self-contained computers, i.e. a client computer 12 and two server computers 14a, 14b. However, it is also possible that the client 12 or the servers 14a, 14b are components in a computer that comprises the client 12 and the servers 14a, 14b.

The client 12 may be a PC, a laptop, a tablet, a smartphone or similar device that is capable of communicating via the communication network 16, for example via the internet, and on which standard software is installed, by means of which HTML pages can be displayed and JavaScript can be executed, such as for example a web browser. The client 12 is used to detect the inputs and/or control actions by a user 18 and to forward them to the server 14a, 14b. Moreover, simulation results that are generated by the servers 14a, 14b are displayed by the client 12 on a screen in the form of graphics or text.

In the computers 12, 14a, 14b of the simulation system, software building blocks 20a, 20b, 20c, 20d are stored, which are associated with subsystems of a complex system. The complex system may for example be an electrical, mechanical, electromechanical, hydraulic and/or electronic device or system, such as are included in aircraft, vehicles, power plants or generally in any technical plant. A subsystem of a complex system may be a control element, an electric or electronic controller, a sensor, an actuator or the like.

As a result of the software building blocks 20a, 20b, 20c, 20d, the system 10 is capable of simulating the complex system. It is possible that the system 10 simulates not only one complex system but a plurality of complex systems. The simulations of the complex system can be interconnected and may influence each other.

A user 18 can interact with all the simulations at the same time via a client 12. If multiple users 18 having a plurality of clients 12 are connected to the system 10, it is also possible for a plurality of users 18 to interact with a plurality of simulations at the same time. There may be an m:n relationship between the simulations and the client 12.

As a simplified example, the complex system may comprise a toggle switch, a motor control, a motor and a fan. The building blocks 20a, 20b, 20c, 20d are then used for simulating any one of these subsystems.

Since the software building blocks 20a, 20b, 20c, 20d comprise at least one server-side component 22a, 22b, 22c, 22d and at least one client-side component 24a, 24b, 24c, 24d, they are shown as dashed lines in FIG. 1. In general, a subsystem can be simulated by one or more server-side components 22a, 22b, 22c, 22d and/or by one or more client-side components 24a, 24b, 24c, 24d. There may be an m:n relationship between the server-side components 22a, 22b, 22c, 22d and the client-side components 24a, 24b, 24c, 24d of a subsystem.

The client-side components 24a, 24b, 24c, 24d are here used for representing (simulating in a graphic and/or textual form) the subsystem and for detecting an interaction with the user 18. For example, the client-side component 24a can represent a toggle switch and can, once actuated by the user 18, represent the toggle switch in a different toggle condition. The client-side components 24a, 24b, 24c, 24d may for example be implemented using JavaScript.

In order to represent a subsystem, three-dimensional representations of the sub-system may be stored on the client 12 or, if necessary, may be transmitted from the servers 14a, 14b to the client. Further, templates (for example XML templates) may be stored on the client 12 and/or on a server 14a, 14b, by means of which templates the possible actuatable conditions and interactions with the user 18 are defined.

The server-side component 22a, 22b, 22c, 22d of a building block 20a, 20b, 20c, 20d is used for simulating the corresponding subsystem of the complex system. For communication, a server-side component 22a, 22b, 22c, 22d can receive user actuations or user interactions from the corresponding client-side component 24a, 24b, 24c, 24d that has transmitted this information via the communication network 16 to the server-side component 22a, 22b, 22c, 22d. Conversely, a server-side component 22a, 22b, 22c, 22d can transmit a simulation result 26 to the corresponding client-side component 24a, 24b, 24c, 24d via the communication net-work 16.

A simulation result 26 comprises here data that contains information about a condition of the subsystem to be simulated, such as for example "toggle switch has been successfully toggled" or "motor rotates at a speed of 30 rpm".

The server-side components 22a, 22b, 22c, 22d are implemented in a JVM (Java Virtual Machine) based language, e.g. Java, Scala, Groovy, Clojure, etc., and may be executed on a virtual machine (JVM) in the servers 14a, 14b. The server-side components 22a, 22b, 22c, 22d may be Java modules.

As shown in FIG. 1, it is possible for the server-side components 22a, 22b, 22c, 22d to be distributed over a plurality of servers 14a, 14b. However, it is also possible for them to be installed on just one server.

The server-side components 22a, 22b, 22c, 22d communicate with each other using a messaging system installed on the server 14a, 14b, such as Akka (an Actor Message System).

Further, the simulation system 10 may comprise a (real) hardware component 28 of the complex system, the other subsystems of which are simulated by the simulation system 10. For example, the hardware component 28 may be a motor controller that can be addressed by the server-side component 22c via a communication link 30.

Figure 2:
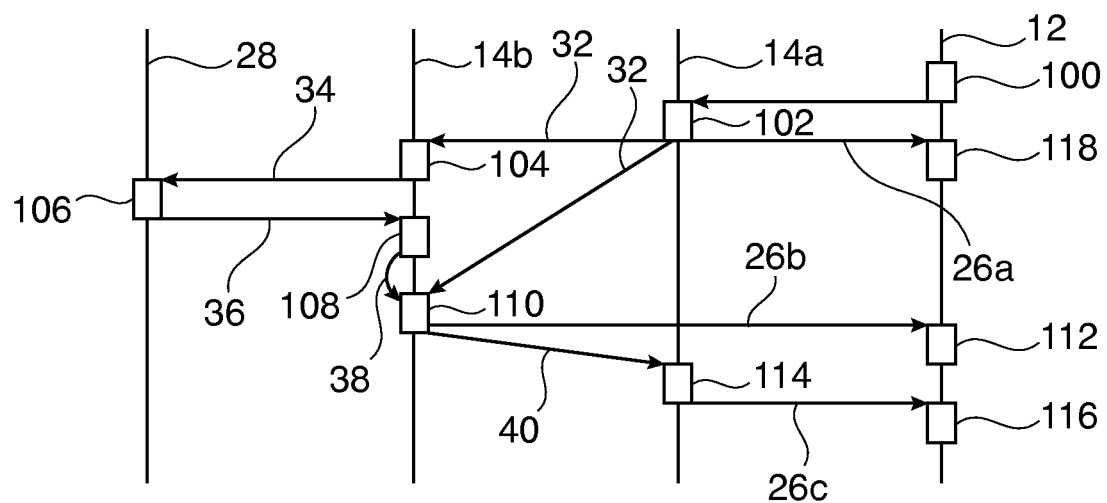
FIG. 2 shows a sequence diagram for a method for simulating a complex system according to an embodiment of the invention.

FIG. 2 shows a sequence diagram for an exemplary flow of a simulation.

In step 100, the user actuates a client-side component 24a, for example by clicking with the mouse pointer on a representation of the corresponding subsystem. This representation may for example represent a toggle switch.

Subsequently, the client-side component 24a transmits this interaction to the corresponding server-side component 22a on the first computer 14a.

In step 102, the server-side component 22a simulates the corresponding subsystem (for example the toggle switch). For example, it may be represented in the server-side component 22a that under certain circumstances the toggle switch has a defect and in this case, although the switch is optically toggled, which will be communicated as a first simulation result 26a by the server-side component 22a of the client-side component 24a, the toggle switch does not close an electric circuit.

In step 118, the representation of the toggle switch is then correspondingly adapted by the client-side component 24a on the client 12.

However, it will be simulated in the example of FIG. 2 that the toggle switch closes an electric circuit and thus the motor and the controller of the complex system are energized. To this end, the server-side component 22a generates a message 32 that is sent to the server-side component 22c (which simulates the controller) and to the server-side component 22d (which simulates the motor).

In step 104, the server-side component 22c starts its own part of the simulation, however, the (real) hardware component 28 is involved. For example, the server-side component 22c can transmit control data 34 to the hardware component 28 (such as a desired rotary speed).

The control data 34 is then processed in step 106 by the hardware component 28, which then generates further output data 36 that is processed further by the server-side component 22c. If the hardware component 28 is for example a motor controller, the output data 36 may comprise information for commutating the motor.

The output data 36 may be processed further by the server component 22c and may be transmitted in a message 38 to the server-side component 22d (for simulating the motor).

In step 110, the server-side component 22d receives the output data 36 in the message 38 and also the message 32 that the electric circuit has been closed by the toggle switch. The server-side component 22d then uses this data to simulate a motor. For example, it can be determined from the output data 36 how quickly the motor rotates or whether it rotates at all.

The rotary speed of the motor can then be communicated to the client-side component 24c as the second simulation result 26b, which in step 112 represents the rotating motor in the web browser on the client 12.

Further, the rotary speed of the motor is determined in a message 40 to the client-side component 22b, which in step 114 simulates the fan and communicates a corresponding rotary speed of the fan to the client-side component 24b as a third simulation result 26c, which then in step 116 correspondingly adapts the representation on the client 12.

In addition it is to be noted that "comprising" does not exclude any other elements or steps, and "a" or "an" does not exclude the plural. Further it is to be noted that any features or steps that were described with reference to any one of the above embodiment examples can also be used in combination with other features or steps of other embodiment examples described above. Reference signs in the claims are not to be regarded as limiting.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A method for simulating a plurality of complex systems being interconnected to each other, the method comprising:
representing the plurality of complex systems in a plurality of simulation building blocks, wherein each simulation building block is associated with a subsystem of a respective one of the plurality of complex systems, wherein each simulation building block comprises at least one client-side simulation component and a server-side simulation component, wherein each simulation building block is a self-contained modular unit of a simulation for a respective one of the plurality of complex systems;
detecting a user interaction with at least one client-side simulation component;
detecting an interaction between the plurality of complex systems;
simulating the plurality of complex systems in server-side simulation components based on the detected user interaction, wherein simulation data for the subsystems is generated by the server-side simulation component;
representing the subsystems based on the simulation data by the corresponding client-side components;
controlling a real hardware subsystem of at least one of the plurality of complex systems, based on the simulation data, using the server-side simulation component of a first simulation building block as an interface between the at least one of the plurality of complex systems and the real hardware subsystem;
detecting output data of the real hardware subsystem in response to the simulation data based control, using the first simulation building block;
generating additional simulation data from the detected output data using the first simulation building block;
communicating the additional simulation data from the first simulation building block to a second simulation building block of the plurality of simulation building blocks; and
simulating a subsystem associated with the second simulation building block using the additional simulation data generated from the first simulation building block, wherein the subsystem associated with the second simulation building block operates independently from the real hardware subsystem.

2. The method of claim 1, further comprising:
communicating the user interaction or the simulation data between a client-side component and a server-side component via a communication network.

3. The method of claim 1, wherein
the subsystems are represented by a web browser, or
the client-side component is implemented using a browser-based language.

4. The method of claim 1, further comprising:
communicating the simulation data using message packets between the simulation building blocks.

5. The method of claim 1, wherein the server-side components are implemented using a JVM-based language.

6. The method of claim 1, wherein
the client-side components are implemented on a client, and
the server-side components are implemented on a server that is connected to the client via a communication network.

7. A computer-readable medium comprises a series of instructions, which when executed on at least one processor cause the at least one processor to carry out the steps of:
representing a plurality of complex systems in a plurality of simulation building blocks, wherein each simulation building block is associated with a subsystem of a respective one of the plurality of complex systems, wherein each simulation building block comprises at least one client-side simulation component and a server-side simulation component, wherein each simulation building block is a self-contained modular unit of a simulation for a respective one of the plurality of complex systems;
detecting a user interaction with at least one client-side simulation component;
detecting an interaction between the plurality of complex systems;
simulating the plurality of complex systems in server-side simulation components based on the detected user interaction, wherein simulation data for the subsystems is generated by the server-side simulation component;
representing the subsystems based on the simulation data by the corresponding client-side components;
controlling a real hardware subsystem of at least one of the plurality of complex systems, based on the simulation data, using the server-side simulation component of a first simulation building block as an interface between the at least one of the plurality of complex systems and the real hardware subsystem;
detecting output data of the real hardware subsystem in response to the simulation data based control, using the first simulation building block;
generating additional simulation data from the detected output data using the first simulation building block;

communicating additional simulation data from a first simulation building block to a second simulation building block of the plurality of simulation building blocks; and simulating a subsystem associated with the second simulation building block based on the additional simulation data generated from the first simulation building block, wherein the subsystem associated with the second simulation building block operates independently from the real hardware subsystem.

8. A simulation system for a plurality of complex systems that are interconnected to each other, the simulation system comprising:

at least one computer, on which simulation building blocks are stored, each of which comprises a client-side component and a server-side component, and a real hardware subsystem of one of the plurality of complex systems, wherein each of a plurality of simulation building blocks is associated with a subsystem of a respective one of the plurality of complex systems, wherein each of the plurality of simulation building blocks is a self-contained modular unit of a simulation for a respective one of the plurality of complex systems, wherein a client-side component that is associated with a subsystem of a respective one of the plurality of complex systems is configured to detect a user interaction with the subsystem and to represent the subsystem in a simulation thereof, wherein a server-side component is configured to simulate the subsystem on the basis of the user interaction, wherein the server-side simulation component of at least one of the plurality of simulation building blocks is operatively coupled to the real hardware subsystem, so as to control the real hardware subsystem based on the simulation data, and to detect output data of the real hardware subsystem, in response to the simulation data based control, the server-side simulation component thereby acting as an interface between at least one of the plurality of complex systems and the real hardware system, wherein additional simulation data generated from the detected output data using a first simulation building block associated with a first subsystem is communicated to a second simulation building block associated with a second subsystem, wherein the second subsystem is simulated based on the additional simulation data, and wherein the second subsystem operates independently from the first subsystem.

* * * * *